United States Patent Office 3,549,682
Patented Dec. 22, 1970

3,549,682
PROCESS FOR THE PRODUCTION OF MIXED
CARBONIC ACID ESTERS
Hugo Vernaleken and Claus Wulff, Krefeld, Ludwig Bottenbruch, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed Dec. 28, 1966, Ser. No. 605,186
Claims priority, application Germany, Dec. 29, 1965,
F 48,036
Int. Cl. C07c 69/00; C08g 17/13
U.S. Cl. 260—463          10 Claims

ABSTRACT OF THE DISCLOSURE

Mixed carbonic acid esters obtained by reacting a diaryl carbonate and an organic dihydroxy compound in substantially equimolar proportions at a temperature of from about 150 to 250° C. while accumulating arylhydroxy by-product and then eliminating said by-product from the reaction mixture and the utility of said esters as auxiliaries for synthetic resins, anti-oxidizing agents for rubber and as intermediates for producing polycondensation products.

---

The present invention relates to new mixed carbonic acid esters and to a process for the production thereof.

The new mixed esters correspond to the formula

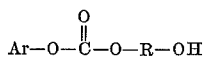

wherein Ar is the monovalent radical of a volatizable monophenol and R is arylene, alkylene or cycloalkylene. Preferred mixed esters are those wherein in the above formula R is the bi-valent radical of a bis-(4-hydroxyphenyl)-alkane, -cycloalkane, -sulphone, -sulphoxide, -sulphide, -ether or -ketone. However, R may also be the bivalent radical of, for example, resorcinol, hydroquinone, dihydroxydiphenyl, furthermore of propanediol-1,3, butanediol-1,3 and -1,4, of pentanediols, hexanediols, heptanediols, octanediols etc., and of 1,4-dihydroxycyclohexane.

The process for the production of these new mixed esters comprises heating 1 mol of an organic dihydroxy compound with 1 mol of a diaryl carbonate at about 150° C. to 250° C. in a closed system and, after the transesterification has been completed, distilling off the eliminated phenol at temperatures below 150° C. under correspondingly reduced pressure, or extracting it by means of solvents.

In order to meet the requirement of heating in a closed system, the starting components can be reacted with each other under reflux of the liberated phenol, in an autoclave under pressure, or continuously in a pressure tube.

By this process, monomeric mixed carbonic acid esters with a functional hydroxyl group are preponderantly obtained. By heating, for example, 1 mol of bisphenol A with 1 mol of diphenyl carbonate under reflux, 1 mol of monophenyl-monobisphenol-A carbonate and 1 mol of phenol are obtained. The latter can be distilled off by distillation at temperatures between preferably about 60° C. and 100° C. and under a pressure of about 15 mm. Hg. The residue consists to about 90% of the mixed carbonic acid ester, which can be obtained in pure form by recrystallization. This is surprising, since it is known that the reaction of dihydroxy compounds with diaryl carbonates in a non-closed system results in a mixture of oligomeric and various highly polymerized polycarbonates.

As suitable dihydroxy compounds, there may be mentioned, for example:

ethylene glycol,
diethylene glycol,
propylene glycol,
1,3-butanediol,
1,5-pentanediol,
1,6-hexanediol,
1,5-heptanediol,
1,8-octanediol,
1,20-eicosanediol, or any other suitable aliphatic dihydroxy compounds;

1,4-dihydroxycyclohexane,
bis-(4-hydroxycyclohexyl)-dimethyl methane,
1,1-(4,4'-dihydroxydicyclohexyl)-cyclohexane,
1,1-(4,4'-dihydroxy-3,3'-dimethyldicyclohexyl)-cyclohexane,
1,1-(2,2'-dihydroxy-4,4'-dimethyldicyclopentyl)-butane,
2,2-(2,2'-dihydroxy-4,4'-ditertiarybutyldicyclopentyl)-propane,
2,2-(3,3'-dihydroxydicyclobutyl)-propane,
1,1'-(4,4'-dihydroxydicyclohexyl)-1-phenylethane,
2,2-(4,4'-dihydroxydicyclopentyl)-hexane,
2,2-(4,4'-dihydroxy-3'-methyldicyclohexyl)-propane,
2,2-(4,4'-dihydroxy-3-methyl-3'-isopropyldicyclohexyl)-butane,
2,2-(3,5,3',5'-tetrachloro-4,4'-dihydroxydicyclohexyl)-propane,
2,2-(3,5,3',5'-tetrabromo-4,4'-dihydroxydicyclohexyl)-propane,
(3,3'-dichloro-4,4'-dihydroxydicyclohexyl)-methane,
2,2'-dihydroxy-5,5'-difluorodicyclohexylmethane,
(3,3'-dihydroxydicyclopentyl)-phenylmethane or any other suitable cycloaliphatic diol; any suitable aromatic dihydroxy compound such as, for example, resorcinol,
4,4'-dihydroxydiphenyl,
hydroquinone and the like; any suitable bis-hydroxyarylalkane such as, for example, (4,4'-dihydroxydiphenyl)-methane,
2,2-(4,4'-dihydroxydiphenyl)-propane,
1,1-(4,4'-dihydroxydiphenyl)-cyclohexane,
1,1-(4,4'-dihydroxy-3,3'-dimethyldiphenyl)-cyclohexane,
1,1-(2,2'-dihydroxy-4,4'-dimethyldiphenyl)butane,
2,2-(2,2'-dihydroxy-4,4'-ditertiarybutyldiphenyl)-propane,
1,1'-(4,4'-dihydroxydiphenyl)-1-phenylethane, any of the methane derivatives which carry two hydroxy aryl groups as well as an alkyl residue having at least two carbon atoms in a secondary alkyl residue with one or more carbon atoms such as, for example, 2,2-(4,4'-dihydroxydiphenyl)-butane,
2,2-(4,4'-dihydroxydiphenyl)-pentane,
3,3-(4,4'-dihydroxydiphenyl)-pentane,
2,2-(4,4'-dihydroxydiphenyl)-hexane,
3,3-(4,4'-dihydroxydiphenyl)-hexane,
2,2-(4,4'-dihydroxydiphenyl)-4-methyl petane,
2,2-(4,4'-dihydroxydiphenyl)-heptane,
4,4-(4,4'-dihydroxydiphenyl)-heptane,
2,2-(4,4'-dihydroxydiphenyl)-tridecane,
2,2-(4,4'-dihydroxy-3'-methyldiphenyl)-propane,
2,2-(4,4'-dihydroxy-3-methyl-3'-isopropyldiphenyl)-butane,
2,2-(3,5,3',5'-tetrachloro-4,4'-dihydroxydiphenyl)-propane,
2,2-(3,5,3',5'-tetrabromo-4,4'-dihydroxydiphenyl)-propane, (3,3'-dichloro-4,4'-dihydroxydiphenyl)-methane,
2,2'-dihydroxy-5,5'-difluorodiphenylmethane,
(4,4'-dihydroxydiphenyl)-phenylmethane,
1,1-(4,4'-dihydroxydiphenyl)-1-phenylethane, and the like, and the bis-hydroxyaryl-cycloalkanes are preferred; any suitable bis-hydroxyarylcycloalkane such as, for example, 1,1-(4,4'-dihydroxy-3,3'-dimethyldiphenyl)-cyclohexane,
1,1-bis-(4-hydroxyphenyl)-cyclohexane,
1,1-(3,3'-dihydroxydiphenyl)-cyclopentane,
2,2-(2,2'-dihydroxy-4,4'-ditertiarybutyldiphenyl)-cyclobutane and the like; any suitable bis hydroxyaryl sulphide such as, for example, (4,4'-dihydroxydiphenyl)-sulphide,
(4,4'-dihydroxy-3,3'-dimethyldiphenyl)-sulphide,
(2,2'-dihydroxy-4,4'-dimethyldiphenyl)-sulphide,
(4,4'-dihydroxy-3,3'-dimethyldiphenyl)-sulphide,
(2,2'-dihydroxy-4,4'-dimethyldiphenyl)sulphide,
(4,4'-dihydroxy-3'-methyldiphenyl)-sulphide,
(4,4'-dihydroxy-3-methyl-3'-isopropyldiphenyl)-sulphide,
(3,5,3',5'-tetrachloro-4,4'-dihydroxydiphenyl)-sulphide,
(3,5,3',5'-tetrabromo-4,4'-dihydroxydiphenyl)-sulphide,
(3,3'-dichloro-4,4'-dihydroxydiphenyl)-sulphide,
(2,2'-dihydroxy-5,5'-difluorodiphenyl)-sulphide and the like; any suitable bishydroxyaryl ethers such as, for example, 4,4'-dihydroxydiphenyl ethers,
4,4'-dihydroxytriphenyl ether,
the 4,3'- 4,2'-, 3,3'- 2,2'- 2,3'-, etc.
dihydroxydiphenyl ethers,
4,4'-dihydroxy-2,5-dimethyldiphenyl ether,
4,4'-dihydroxy-2,6-dimethyldiphenyl ether,
4,4'-dihydroxy-3,3'-diisobutyldiphenyl ether,
4,4'-dihydroxy-3,3'-diisopropylphenyl ether,
4,4'-dihydroxy-3,2'-dinitrodiphenyl ether,
4,4'-dihydroxy-3,3'-dichlorodiphenyl ether,
4,4'-dihydroxy-3,3'-difluorodiphenyl ether,
4,4'-dihydroxy-2,3'-dibromodiphenyl ether
4,4'-dihydroxydinaphthyl ether,
4,4'-dihydroxy-3,3'-dichlorodinaphthyl ether,
2,4'-dihydroxytetraphenyl ether,
4,4'-dihydroxypentaphenyl ether,
4,4'-dihydroxy-2,6-dimethoxy diphenyl ether and
4,4'-dihydroxy-2,5-diethoxy diphenyl ether as well as of the ethers set forth in Chemical Reviews, 38, 414–417 (1946), U.S. Pats. 2,739,171 and 3,014,891 and the like; any suitable bis-hydroxyaryl sulphone such as, for example, 4,4'-dihydroxydiphenyl sulphone,
2,2'-dihydroxydiphenyl sulphone,
3,3'-dihydroxydiphenyl sulphone,
4,4'-dihydroxy-2,2'-dimethyl-diphenyl sulphone,
4,4'-dihydroxy-3,3'-dimethyl-diphenyl sulphone,
2,2'-dihydroxy-4,4'-dimethyldiphenyl sulphone,
4,4'-dihydroxy-2,2'-diethyldiphenyl sulphone,
4,4'-dihydroxy-3,3'-diethyldiphenyl sulphone,
4,4'-dihydroxy-2,2'-ditertiary butyldiphenyl sulphone,
4,4'-dihydroxy-3,3'-ditertiary butyl-diphenyl sulphone and
2,2'-dihydroxy-1,1'-dinaphthylene sulphone, all of which are disclosed in U.S. Pat. 3,271,367, as well as the sulfones set forth in U.S. Pat. 3,014,891 and the like; any suitable bis-hydroxyaryl sulphoxide such as, for example, 4,4'-dihydroxydiphenyl sulfoxide,
2,2'-dihydroxydiphenyl sulfoxide,
3,3'-dihydroxydiphenyl sulfoxide,
4,4'-dihydroxy-2,2'-dimethyldiphenyl sulfoxide,
4,4'-dihydroxy-3,3'-dimethyldiphenyl sulfoxide,
2,2'-dihydroxy-4,4'-dimethyl-diphenyl sulfoxide,
4,4'-dihydroxy-2,2'-diethyldiphenyl sulfoxide,
4,4'-dihydroxy-3,3'-diethyldiphenyl sulfoxide,
4,4'-dihydroxy-2,2'-ditertiary butyl-diphenyl sulfoxide,
4,4'-dihydroxy-3,3'-ditertiary butyl-diphenyl sulfoxide,
2,2'-dihydroxy-1,1'-dinaphthylene sulfoxide and the like; any suitable bis-hydroxyaryl ketone such as, for example, 4,4'-dihydroxybenzophenone and the like; bis (4-hydroxymonochlorophenyl)-dimethylmethane, bis(4-hydroxydichlorophenyl)-dimethylmethane, a,a,a',a' - tetramethyl-a,a'-bis(4-hydroxyphenyl-p-xylene) and the like.

Any suitable diaryl carbonate may be used to react with the dihydroxy compound in the first step of this invention. Some such suitable diaryl carbonates are, for example, diphenyl carbonate, dicresol carbonate, dicyclohexylphenyl carbonate, bisnaphthyl carbonate, di-o-, m- or p-tolyl carbonate, dihalophenyl carbonates such as, for example, dibromophenyl carbonate, dichlorophenyl carbonate and the like; di-(polyhalo)phenyl carbonates such as, for example, di-(trichlorophenyl) - carbonate, di - (tribromophenyl)-carbonate and the like; di-(alkylphenyl)-carbonates such as, for example di-o-, m- or p-tolyl carbonates, dixylyl carbonates and the like.

The transesterification of the dicarbonates with the dihydroxy compounds under the above conditions can optionally be furthered by the addition of basic, neutral or acidic catalysts in quantities from about $1 \times 10^{-4}$ to about 1% by weight. As suitable catalysts, there may be mentioned, for example: caustic soda, potassium hydroxide, alkali metal and alkaline earth metal alcoholates and phenolates, high boiling organic bases, such as acridine; metal hydrides, such as lithium and calcium hydride; alkali or alkaline earth metals, such as sodium, potassium, magnesium, and calcium; metal oxides, such as zinc oxide, aluminium oxide, lead oxide, antimonotrioxide, cerium oxide, and boron oxide; acids, such as phosphoric acid, phenylphosphonic acid and p-toluene sulphonic acid; salts, such as sodium benzoate, calcium acetate, and the monopotassium salt of phenylphosphonic acid, and boron phosphate and the like in a catalytic amount.

The distilling off of the eliminated phenol is expediently carried out at temperatures between about 60° C. and about 100° C. under appropriately reduced pressure. If, instead, the phenol is to be extracted, toluene, xylene or water can be employed for this purpose, for example.

The new mixed carbonic acid esters can be used as auxiliaries for synthetic resins, for example, as antioxidizing agents for rubber, and as intermediate products for the production of polycondensation products.

EXAMPLE 1

228 g. of 2,2-bis-(4-hydroxyphenyl)-propane (bisphenol A) and 214 g. of diphenyl carbonate are heated in a glass flask of 1 liter capacity, which is equipped with stirrer, reflux condenser and thermometer, for 240 minutes at a temperature of 230 C. The eliminated phenol boils under reflux. The reflux condenser is then exchanged for a distilling apparatus and 94 g. of phenol are distilled off at a heating bath temperature of 80 to 100° C. and a pressure of 15 mm. Hg. The residue solidifies to form a glassy melt and contains, according to gas-chromatographic examination, besides small quantities of the starting material and of higher-condensed compounds, 90% bisphenol-A-phenyl carbonate.

For purification, 20 g. of the crude product are dissolved in 100 ml. toluene, the unreacted bisphenol is extracted twice with 25 ml. of portions of a 5% sodium hydroxide solution and the organic phase is subsequently washed with water until neutral. After drying over sodium sulphate, the bisphenol-phenyl carbonate is precipitated by the addition of 200 ml. of ligroin. The resultant oil crystallizes after about 10 hours. It is separated from the mother liquor and recrystallized from 100 ml. of cyclohexane, 14 g. of the pure product of melting point 85° C. are obtained.

Calcd. for $C_{22}H_{20}O_4$ (348.4), percent: C, 75.84; H, 5.79. Found (percent): C, 75.56–75.81; H, 5.93–5.94.

EXAMPLE 2

161 g. of bisphenol A and 208 g. of 4,4'-dichloro-diphenyl carbonate are heated in the apparatus described in Example 1 for 3 hours at a temperature of 220° C. The eliminated chlorophenol boils under reflux. The reflux condenser is then exchanged for a distilling apparatus and 92 g. of chlorophenol are distilled off at a heating bath temperature of 100° C. and a pressure of 15 mm. Hg. The residue solidifies to form a glassy melt and contains over 90% of the monochlorophenyl carbonate of bisphenol A.

For purification, 40 g. of the crude product are dissolved in 50 ml. of chloroform and treated twice with 20 ml. portions of a 5% sodium hydroxide solution. After the organic phase has been washed until neutral and dried over sodium sulphate, the pure product is precipitated by the addition of 100 ml. of ligroin. 26 g. of the pure product are obtained. The melting point lies at 74° C. By the addition of another 100 ml. of ligroin, a further product can be precipitated from the mother liquor in the form of an oil, which crystallizes completely after 2 to 3 days.

Calcd. for $C_{22}H_{19}O_4Cl$ (382.9), percent: C, 69.02; H, 5.00. Found (percent): C, 69.34; H, 5.18.

EXAMPLE 3

196.5 g. of bisphenol A and 218 g. of di-p-cresyl carbonate are heated under the conditions described in Examples 1 and 2 with 0.2 mg. of the disodium salt of 2,2-(4,4'-dihydroxydiphenyl)-propane as catalyst for 8 hours at 240° C. under reflux of p-cresol, and 87 g. of p-cresol are then distilled off at a heating bath temperature of 110° C. and a pressure of 15 mm. Hg. The residue which slowly solidifies to form a glassy melt, contains the monocresyl carbonate of 2,2-(4,4'-dihydroxydiphenyl)-propane with a degree of purity which suffices for many reactions.

For isolation, 20 g. of this crude material, dissolved in 50 ml. of chloroform, are first extracted twice with 20 ml. portions of a 5% sodium hydroxide solution, washed with water until neutral, dried over sodium sulphate and an oil is precipitated by the addition of 100 ml. of petroleum ether. This oil is separated from the solvent by decanting, then taken up in 20 ml. of chloroform and crystallized from the mixture of solvents by the addition of 20 ml. of ligroin. 12 g. of a product of melting point 39° C. are obtained.

Calcd. for $C_{23}H_{22}O_4$ (362.4), percent: C, 76.21; H, 6.12. Found (percent): C, 76.31; H, 6.31.

EXAMPLE 4

262 g. of 1,1-(4,4'-dihydroxydiphenyl)-cyclohexane and 209 g. of diphenyl carbonate are heated under the conditions described in the preceding examples for 4 hours at a heating bath temperature of 220° C. under reflux of phenol. After 88 g. of phenol have been distilled off at a heating bath temperature of 100° C. and a pressure of 15 mm. Hg., the residue is dissolved in 1.5 liters of toluene. After cooling, 45 g. of 1,1-(4,4'-dihydroxydiphenyl)-cyclohexane are obtained. The motor liquor is concentrated. 20 g. of the crude product thus obtained are crystallized from a mixture of 40 ml. of chloroform and 80 ml. of petroleum ether. The yield of monophenyl carbonate of 1,1-(4,4'-dihydroxydiphenyl)-cyclohexane is 10 g. The melting point lies at 58° C. By concentration of the mother liquors, a further 6 g. are obtained in the form of a yellowish oil, which crystallizes after prolonged standing.

Calcd. for $C_{25}H_{24}O_4$ (388.5), percent: C, 77.30; H, 6.23. Found (percent): C, 77.64; H, 6.21.

EXAMPLE 5

109 g. of 4,4-dihydroxydiphenyl sulphide and 107 g. of diphenyl carbonate are heated with 2 mg. of the sodium salt of 2,2-(4,4'-dihydroxydiphenyl)-propane in accordance with the preceding examples for 3½ hours under reflux of phenol. 47 g. of phenol are then distilled off at a bath temperature of 100° C. and a pressure of 15 mm. Hg. 140 g. of this crude product are dissolved hot in 1.5 liters of toluene, after cooling, 35 g. of crystals are precipitated, which melt at 140° C. after recrystallization from toluene. The substance was identified as monophenyl carbonate of 4,4-dihydroxdiphenyl sulphide.

Calcd. for $C_{25}H_{18}O_5S_2$ (462.6), percent: C, 64.92; H, 3.92. Found (percent): C, 64.49; H, 3.91.

The mother liquors are concentrated by evaporation and can be used as crude product for further reactions. For purification, 50 g. are recrystallized from 150 ml. of toluene/ligroin 1:1, 6 g. of crystals being obtained, which melt at 97° C. A further 40 g. of the substance can be isolated from this mother liquor by concentration.

Calcd. for $C_{19}H_{14}O_4S$ (338.4), percent: C, 67.44; H, 4.17. Found (percent): C, 67.76; H, 4.23.

EXAMPLE 6

240 g. 2,2-(4,4'-dihydroxdicyclohexyl)-propane and 214 g. of diphenyl carbonate are heated under the conditions described in the preceding examples for 3 hours at 220° C. under reflux of phenol, and 81 g. of phenol are subsequently distilled off at a heating bath temperature of 100° C. and a pressure of 15 mm. Hg. 91 g. of the starting compounds, predominantly 2,2-(4,4'-dihydroxydicyclohexyl-propane, are separated by crystallization from 2 liters of toluene /ligroin 1:1. By evaporation of the mother liquors, 280 g. of the crude product are obtained. For purification of the monophenyl carbonate of 2,2-(4,4'-dihydroxydicyclohexyl)-propane, 15 g. of this substance are repeatedly recrystallized from ligroin. 6 g. of crystals are obtained which melt at 39° C.

Calcd. for $C_{22}H_{32}O_4$ (360.5), percent, C, 73.30; H, 8.95. Found (percent): C, 73.18; H, 9.01.

EXAMPLE 7

118 g. 1,6-hexanediol and 214 g. of diphenyl carbonate are heated under the conditions described in the preceding examples for 5 hours at 200° C. under reflux of phenol, and 91 g. of phenol are then distilled off at a bath temperature of 100° C. 15 mm. Hg. To remove the unreacted hexanediol, the syrupy residue is twice extracted with 500 ml. portions of water at 80° C., then taken up in 1 liter of carbon tetrachloride and dried over sodium sulphate. After evaporation of the solvent, there result 180 g. of this crude product of residue. 30 g. of this crude product are crystallized from 50 ml. of a toluene/ligroin mixture 9:1. 5 g. of crystals are obtained, which were identified by infra-red spectroscopy as hexanediol - (1,6)-bisphenyl carbonate. The mother liquor is concentrated by evaporation and contains hexanediol-1,6-monophenyl carbonate. For purification, this oil is extracted 5 times with 10 ml. portions of petroleum ether at 40° C. and then freed from the residual solvent at a temperature of 50° C. under vacuum (15 mm. Hg). After these operations, there remain 12 g. of a colorless clear oil; the thin layer-chromatographic test for purity shows a degree of purity of 95%.

Calcd. for $C_{13}H_{18}O_4$ (238.3), percent: C, 65.53; H, 7.62. Found (percent): C, 66.24; H, 7.41.

What is claimed is:

1. A process for producing mixed carbonic acid esters of the formula

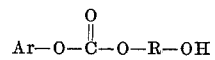

wherein Ar is a monovalent radical of a volatilizable monophenol and R is arylene, alkylene or cycloalkylene, said process comprising heating substantially equimolar proportions of a compound of the formula

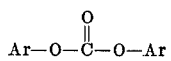

wherein R is as aforesaid until transesterification is complete to obtain a mixture of said mixed carbonic acid ester of said formula and Ar-OH by-product and thereafter eliminating said by-product from said reaction mixture at a temperature below about 150° C.

2. The process of claim 1 wherein said heating is carried out under reflux of said Ar-OH by-product.

3. The process of claim 1 wherein the heating is carried out in an autoclave.

4. The process of claim 1 wherein said heating is carried out in the presence of a transesterification catalyst.

5. The process of claim 1 wherein said Ar-OH by-product is eliminated from the reaction mixture by distillation under reduced pressure.

6. The process of claim 1 wherein said Ar-OH by-product is eliminated from the reaction mixture by extraction with a solvent.

7. The monophenyl carbonate of 1,1-bis-(4-hydroxyphenyl)-cyclohexane.

8. The monophenyl carbonate of bis-(4-hydroxyphenyl) sulphide.

9. The monophenyl carbonate of bis-(4-hydroxycyclohexyl)-dimethylmethane.

10. The monophenyl carbonate of hexanediol-1,6.

References Cited

UNITED STATES PATENTS

| 3,206,426 | 9/1965 | Keskkula et al. | 260—463 X |
| 2,787,632 | 4/1957 | Stevens | 260—463 |
| 3,148,172 | 9/1964 | Fox | 260—463 X |
| 3,251,873 | 5/1966 | Kurkjy et al. | 260—463 |
| 3,255,230 | 6/1966 | Kurkjy et al. | 260—463 |

OTHER REFERENCES

H. Schnell, Polycarbonates, A New Class of Thermoplastics. Preparation and Properties of Aromatic Polyesters of Carbonic Acid. Angew. Chem. 68 (20), 633–640 (1956). [Translation by Associated Technical Services, East Orange, N.J.]

Carothers et al., J. Am. Chem. Soc. 52, 314 (1930).

C. R. Noller, Chemistry of Organic Compound, W. B. Saunders Co. (Philadelphia, 1956).

LEON ZITVER, Primary Examiner

L. DE CRESCENTE, Assistant Examiner

U.S. Cl. X.R.

260—47, 79, 814